(12) United States Patent
Liu et al.

(10) Patent No.: US 8,908,713 B2
(45) Date of Patent: Dec. 9, 2014

(54) METHODS FOR REQUESTING AND RESPONDING TO MULTIMEDIA BROADCAST MULTICAST SERVICE (MBMS) COUNTING

(75) Inventors: Jiamin Liu, Beijing (CN); Li Chen, Beijing (CN); Xiaodong Yang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/701,787

(22) PCT Filed: Sep. 26, 2011

(86) PCT No.: PCT/CN2011/080146
§ 371 (c)(1),
(2), (4) Date: Feb. 12, 2013

(87) PCT Pub. No.: WO2012/041193
PCT Pub. Date: Apr. 5, 2012

(65) Prior Publication Data
US 2013/0176923 A1 Jul. 11, 2013

(30) Foreign Application Priority Data
Sep. 30, 2010 (CN) .......................... 2010 1 0503785

(51) Int. Cl.
*H04J 3/16* (2006.01)
*H04W 72/00* (2009.01)
*H04L 12/18* (2006.01)
*H04W 4/20* (2009.01)
*H04W 4/06* (2009.01)

(52) U.S. Cl.
CPC .............. *H04W 72/005* (2013.01); *H04W 4/06* (2013.01); *H04L 12/189* (2013.01); *H04W 4/20* (2013.01)
USPC ............................ 370/437; 370/479; 370/480

(58) Field of Classification Search
USPC .......................................... 370/437, 479, 480
See application file for complete search history.

(56) References Cited

U.S. PATENT DOCUMENTS 8,688,145 B2 * 4/2014 Lee et al. .................... 455/456.3
2008/0043658 A1 * 2/2008 Worrall ......................... 370/312
(Continued)

FOREIGN PATENT DOCUMENTS

CN 101171868 A 4/2008
CN 101690277 A 3/2010
(Continued)

OTHER PUBLICATIONS

International Search Report in PCT/CN2011/080146 mailed Jan. 12, 2012.

(Continued)

*Primary Examiner* — Ricky Ngo
*Assistant Examiner* — Dewanda Samuel
(74) *Attorney, Agent, or Firm* — Marshall, Gerstein & Borun LLP (57) ABSTRACT

Disclosed is a method for requesting and feeding back a multimedia broadcast multicast service (MBMS) state, the method being used for allowing a network side to inform a related user equipment (UE) to feed back MBMS state information and allowing the informed UE to feed back the MBMS state information. The request method comprises: when necessary to acquire the receiving state of an MBMS, a base station transmits, through a physical downlink control channel (PDCCH) scrambled by a radio network temporary identifier (RNTI) belonging specially to an MBMS service, or through a system message, a multicast control channel (MCCH) change notification to the UE; and the base station transmits an MBMS state report request to the UE through the changed MCCH. The present invention also discloses a device for implementing the method.

20 Claims, 9 Drawing Sheets

(56) References Cited

U.S. PATENT DOCUMENTS

| | | | |
|---|---|---|---|
| 2008/0045224 A1* | 2/2008 | Lu et al. | 455/446 |
| 2009/0207774 A1* | 8/2009 | Lee et al. | 370/312 |
| 2011/0019604 A1* | 1/2011 | Chun et al. | 370/312 |
| 2011/0164540 A1 | 7/2011 | Lee et al. | |
| 2011/0235565 A1* | 9/2011 | Wu | 370/312 |
| 2011/0305183 A1* | 12/2011 | Hsu et al. | 370/312 |
| 2012/0039229 A1* | 2/2012 | Etemad et al. | 370/312 |

FOREIGN PATENT DOCUMENTS

| | | | |
|---|---|---|---|
| CN | 101841772 A | 9/2010 | |
| CN | 102083003 A | 6/2011 | |
| KR | 10-2006-0115282 A | 11/2006 | |
| WO | WO2009022882 | * 2/2009 | H04B 7/26 |

OTHER PUBLICATIONS

"Universal Mobile Telecommunications System (UMTS); Introduction of the Multimedia Broadcast/Multicast Service (MBMS) in the Radio Access Network (RAN); Stage 2," (3GPP TS 25.346 version 9.1.0 Release 9); Apr. 27, 2010.

"LTE; Evolved Universal Terrestrial Radio Access (E-UTRA); Physical layer procedures," (3GPP TS 36.213 version 9.2.0 Release 9), Jun. 1, 2010.

"MBMS Counting Request for LTE Rel-10," 3GPP TSG-RAN WG2 #71, Aug. 16, 2010.

"Notification Mechanism for MBMS Counting Request," 3GPP TSG-RAN WG2 Meeting #71b, Oct. 4, 2010.

Search Report in EP Application No. 11828089.0 dated Aug. 27, 2014.

* cited by examiner

METHODS FOR REQUESTING AND RESPONDING TO MULTIMEDIA BROADCAST MULTICAST SERVICE (MBMS) COUNTING

The present application is a US National Stage of International Application No. PCT/CN2011/080146, filed 26 Sep. 2011, designating the United States, and claiming priority to Chinese Patent Application No. 201010503785.6, filed 30 Sep. 2010.

FIELD OF THE INVENTION

The present invention relates to the field of communications and particularly to a method of and apparatus for requesting and responding to a Multimedia Broadcast Multicast Service (MBMS) Counting.

BACKGROUND OF THE INVENTION

There is increasing popularization of MBMSs along with the development of software and hardware technologies of communications. In order to save frequency resources and the utilization ratio of spectrums, the technology of Multicast Broadcast Single Frequency Network (MBSFN) has been proposed in the industry, where there is synchronous transmission over a plurality of cells at the same frequency at the same time. One of common channels in the MBSFN technology is a Multicast Control Channel (MCCH).

The MCCH is a point to multipoint downlink channel over which a network transmits MBMS related control information in the MBSFN area to a User Equipment (UE), and one MCCH can correspond to one or more Multicast Traffic Channels (MTCHs), that is, control information of a plurality of MTCHs can be carried over one MCCH.

In a Long Term Evolution (LTE) system, an MBMS Counting request is carried over an MCCH. At present only a user equipment which is receiving an MBMS related to an MCCH will read the content over the MCCH in each modification period, that is, when a MBMS Counting request is carried over an MCCH in a specific modification period, only a UE which is receiving an MBMS of the MBSFN area can obtain the request and further make a report and perform other operations. A large number of UEs which are not receiving the MBMS of the area, even in a connected state, cannot know Counting request of the service over the MCCH and thus cannot make any response. Thus, particularly for the service of which transmission has not been initiated in the MBSFN area, the numerous UEs which have not received the MBMS of the area are very likely to be a group of potential recipients of the service to which the counting request refers, so if these UEs cannot receive the request and further make a response in a counting response procedure, then there may be an influence upon determination at the network side as to whether to initiate the service, and further the service which would otherwise be initiated may possibly not be initiated, thus the service is impeded from being deployed.

SUMMARY OF THE INVENTION

Embodiments of the invention provide a method of and apparatus for requesting and responding to an MBMS counting so that a relevant UE is instructed at the network side to respond to MBMS counting and the UE send the MBMS counting response to the network side.

A method of requesting an MBMS counting according to an embodiment of the invention includes the steps of:

a node B, when an MBMS counting procedure is triggered, transmitting a Multicast Control Channel, MCCH, change notification to each user equipment over a Physical Downlink Control Channel, PDCCH, scrambled by an MBMS-specific Radio Network Temporary Identifier, RNTI, or in a system message; and the node B transmitting an MBMS counting request to the user equipment over a changed MCCH.

A method of responding to a Multimedia Broadcast Multicast Service (MBMS) counting according to an embodiment of the invention includes the steps of:

a user equipment receiving a Multicast Control Channel, MCCH, change notification over a Physical Downlink Control Channel, PDCCH, scrambled by an MBMS-specific Radio Network Temporary Identifier, RNTI, or in a system message;

the user equipment receiving an MBMS counting request over a changed MCCH; and the user equipment returning an MBMS counting response.

A node B according to an embodiment of the invention includes:

a first channel module configured, when an MBMS counting procedure is triggered, to transmit a Multicast Control Channel, MCCH, change notification to each user equipment over a Physical Downlink Control Channel, PDCCH, scrambled by an MBMS-specific Radio Network Temporary Identifier, RNTI, or in a system message; and a second channel module configured to transmit an MBMS counting request to the user equipment over a changed MCCH.

A user equipment according to an embodiment of the invention includes:

a first channel module configured to receive a Multicast Control Channel, MCCH, change notification over a Physical Downlink Control Channel, PDCCH, scrambled by an MBMS-specific Radio Network Temporary Identifier, RNTI, or in a system message; and a second channel module configured to receive an MBMS counting request over a changed MCCH and to return an MBMS counting response.

In the embodiments of the invention, a node B transmits an MCCH change notification to each user equipment over a Physical Downlink Control Channel (PDCCH) scrambled by a Radio Network Temporary Identifier (RNTI) or in a system message, and since the PDCCH and the system message are a channel and a message which all the UEs can monitor in a cell, the MCCH change notification can reach all the UEs, thus facilitating reception of MBMS counting responses of all the UEs, particularly a UE which is not receiving an MBMS, making the information on the received counting responses more comprehensive and further facilitating accurate determination as to whether to initiate the MBMS.

DETAILED DESCRIPTION OF THE EMBODIMENTS

In an embodiment of the invention, a node B transmits an MCCH change notification to each user equipment over a Physical Downlink Control Channel (PDCCH) scrambled by a Radio Network Temporary Identifier (RNTI) or in a system message, and since the PDCCH and the system message are a channel and a message which all the UEs can monitor in a cell, the MCCH change notification can reach all the UEs, thus facilitating reception of MBMS counting responses of all the UEs, particularly a UE which is not receiving an MBMS, making the information on the received counting responses more comprehensive and further facilitating accurate determination as to whether to initiate the MBMS.

Figure 1:
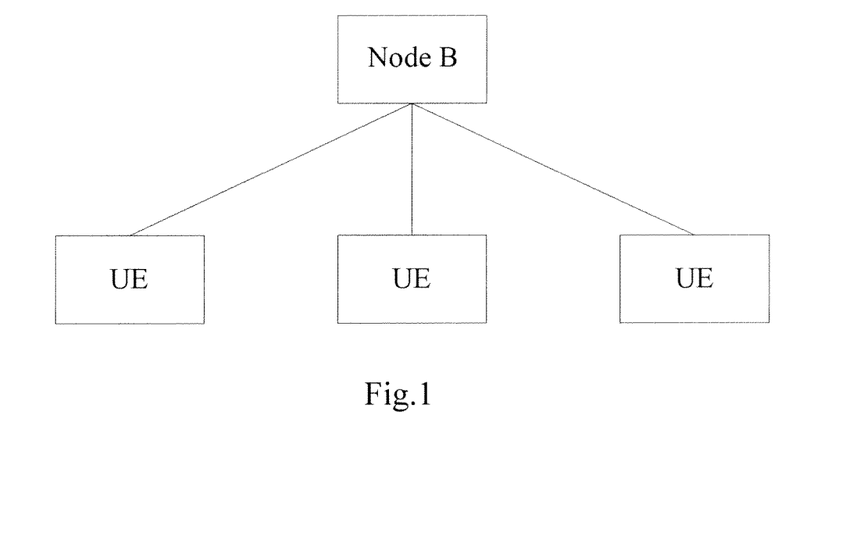
FIG. 1 is a structural diagram of a communication system in an embodiment of the invention.

Referring to FIG. 1, a communication system in this embodiment includes a node B and UEs. The node B may be an evolved Node B (eNB) or an evolved node B having a direct interface with a relay node, e.g., a DeNB, etc.

The node B is configured, when an MBMS counting procedure is triggered, to transmit a Multicast Control Channel (MCCH) change notification to each user equipment over a Physical Downlink Control Channel (PDCCH) scrambled by an MBMS-specific RNTI or in a system message and to transmit an MBMS counting request to the user equipment over a changed MCCH. The MCCH change notification and the MBMS counting request may be performed in one modification period or may be performed in two modification periods. The node B is further configured to receive MBMS counting responses transmitted from the UEs, to summarize the MBMS counting responses and to transmit a summary result to an MBMS Coordination Entity (MCE). For transmission of the MCCH change notification, the node B transmits the MCCH change notification to the user equipment over the PDCCH scrambled by the RNTI or in the system message in a modification period upon reception of an MBMS counting indication message transmitted from the MCE; or the node B transmits the MCCH change notification to the user equipment over the PDCCH scrambled by the RNTI or in the system message periodically in the range of a configured interval of time, where the configured interval of time can be configured by the MCE to the node B in the MBMS counting indication message. And a first interval of time configured for the PDCCH may be identical in value to or may be different in value from a third interval of time configured for the system message, and the modification period in which the MCCH change notification is transmitted over the PDCCH may also be different from a system cycle in which the system message is transmitted. The MCCH change notification includes identification information of a changed MCCH or an MCCH change indicator or includes identification information of a changed MCCH and an MCCH change indicator. The MBMS counting request includes an identifier of an MBMS to instruct the UE to respond whether it is interested in the service corresponding to the identifier. The MBMS counting request can further include a responding condition to instruct a UE satisfying the responding condition to make a response.

Particularly the responding condition includes at least one of the following conditions:

A UE in a connected state makes a report, and under this condition, pertinent response information can be obtained and network resources can be saved at a lower number of conflicts;

All the UEs make a report, and under this condition, comprehensive response information can be obtained;

A UE interested in the service specified by the MBMS counting request makes a report, and under this condition, network resources can be saved at a lower number of conflicts; and A UE satisfying a configured probability makes a report, and under this condition, network resources can be saved at a lower number of conflicts.

There are other further responding conditions possible which can be set as needed in practice and they will not be enumerated here.

For feeding back the summary result to the MCE, the node B transmits the summary result to the MCE at a configured second interval of time which can be identical in value to the first interval of time; or the node B transmits the summary result to the MCE when the summary result satisfies a preset report condition. The summary result includes the number of UEs interested in the MBMS and other information.

In this embodiment, all the count-starting points of the first interval of time, the second interval of time and the third interval of time can be the time when the MBMS counting indication message transmitted from the MCE is received.

The RNTI may be a Multimedia Broadcast Multicast Service (MBMS)-Radio Network Temporary Identifier (M-RNTI) or a Multimedia Broadcast Multicast Service (MBMS) State Report-specific Radio Network Temporary Identifier (MR-RNTI), and both the M-RNTI and the MR-RNTI are MBMS-specific RNTIs. The system message may include a System Information Block (SIB) 13 message.

When the RNTI is an M-RNTI, the total number of bits corresponding to the PDCCH scrambled by the M-RNTI may exceed the number of MCCHs indicated by the PDCCH or may not exceed the number of MCCHs indicated by the PDCCH, which is determined by a bandwidth of the system, and the number of MCCHs is represented in 8 bits in this embodiment. When the total number of bits corresponding to the PDCCH scrambled by the M-RNTI does not exceed the total number of MCCHs indicated by the PDCCH, the MCCH change notification includes identification information of a changed MCCH or an MCCH change indicator.

The MCCH change indicator indicates that this is an MCCH change resulting from an MBMS Counting request, and the MCCH change indicator can be embodied in a number of specific schemes for which reference can be made to the following description but which will not be limited to those provided in this embodiment, and other schemes in which the MCCH change indicator are embodied to indicate this can be applicable to this embodiment.

In a first scheme, the MCCHs are represented in all the bits of the PDCCH to have the bits taking different values correspond to the different MCCHs, for example, each of the 8 bits corresponds to one MCCH, and the MCCH corresponding to the bit with the value of 1 is changed, that is, the MBMS counting request is to be transmitted over the changed MCCH; and the MCCH corresponding to the bit with the value of 0 is not changed.

In a second scheme, all the bits corresponding to the PDCCH scrambled by the M-RNTI are 0 representing an MCCH change indicator, and this scheme can notify the UE of an occurring MCCH change but without indicating particularly which MCCH is changed. When the total number of bits corresponding to the PDCCH scrambled by the M-RNTI exceeds the total number of MCCHs indicated by the PDCCH, the MCCH change notification includes identification information of a changed MCCH and an MCCH change indicator or includes an MCCH change indicator. When the MCCH change notification includes identification information of a changed MCCH and an MCCH change indicator, each MCCH corresponds to one bit, and the identification information of the changed MCCH is represented by the value of the bit, for example, the MCCH corresponding to the bit with the value of 1 is changed, that is, the MBMS counting request is to be transmitted over the changed MCCH, and the excess bits beyond the number of MCCHs are used for an MCCH change indicator, for example, one excess bit takes the value of 1 to indicate that this is an MCCH change resulting from an MBMS Counting request. When the MCCH change notification includes an MCCH change indicator, the excess bits beyond the number of MCCHs indicated by the PDCCH are used for the MCCH change indicator, where each MCCH corresponds to one bit, and all the bits corresponding to the MCCHs take the value of 0, and this scheme can notify the UE of an occurring MCCH change but without indicating particularly which MCCH is changed.

When the RNTI is an MR-RNTI or the system message is adopted, the structure of the message can be designed flexibly, and any scheme in which an MCCH change indicator or identification information of a changed MCCH is indicated can be applicable to this embodiment.

The UE is configured to receive the Multicast Control Channel (MCCH) change notification over the Physical Downlink Control Channel (PDCCH) scrambled by the MBMS-specific RNTI or in the system message, to receive the MBMS counting request over the changed MCCH and to return the MBMS counting response. If the node B transmits the MCCH change notification and the MBMS counting request in one modification period, then the UE also receives the MCCH change notification and the MBMS counting request in the one modification period. If the node B transmits the MCCH change notification in a modification period and the MBMS counting request in a next modification period, then the UE also receives the MCCH change notification in the modification period and the MBMS counting request in the next modification period.

When the MBMS counting request includes the responding condition, the UE determines whether it satisfies the responding condition, for example, the UE determines whether it is in a connected state, whether it is interested in the indicated MBMS, where a user can input an interested or uninterested indicator to the UE, or the UE generates a random number and determines whether the random number satisfies the configured probability; and when the UE satisfies responding condition, the UE returns the MBMS counting response, possibly further carrying an interested or uninterested indicator, to the node B.

When the RNTI is an MR-RNTI or the system message is adopted, the location and message structure of the PDCCH scrambled by the MR-RNTI and the structure of the system message for transmitting the MCCH change notification can be pre-configured in the UE or signaled in another system message. The UE receives and parses the MCCH change notification according to the signaled location and structures.

When the RNTI is an M-RNTI, particularly when the total number of bits corresponding to the PDCCH scrambled by the M-RNTI does not exceed the total number of MCCHs indicated by the PDCCH, in the first scheme, the UE parses the notification to obtain the bit with the value of 1 and hereby determines the changed MCCH and receives the MBMS counting request over the changed MCCH in a next MCCH modification period. In the second scheme, the UE parses the notification to obtain the bits of the PDCCH scrambled by the M-RNTI, all of which are 0, and hereby knows that this message is an MCCH change indicator and there is an MCCH change resulting from an MBMS counting indication but at this time the UE does not know which MCCH is changed. Thus the UE shall go through all the MCCHs in a next MCCH modification period or in the same modification period to receive the MBMS counting request. When the total number of bits corresponding to the PDCCH scrambled by the M-RNTI exceeds the total number of MCCHs indicated by the PDCCH, the UE knows that the message is an MCCH change indicator because the bit for an MCCH change indicator takes the value of 1 and further determines the changed MCCH according to the value of the bit corresponding to the MCCH and receives the MBMS counting request over the changed MCCH in a next MCCH modification period or in the same modification period. Or the UE parses the notification to obtain the bits corresponding to the PDCCH, all of which are 0, and hereby knows that this message is an MCCH change indicator, and the UE shall go through all the MCCHs in a next MCCH modification period or in the same modification period to receive the MBMS counting request. The scheme in which the RNTI is an M-RNTI requires no change to an existing message structure and has a lower influence upon an existing communication protocol.

The foregoing description of the UE applies to an MBMS-enabled high-grade UE, a UE in support an MBMS counting response mechanism, e.g., a Release 10 (R10)-enabled UE, etc. For an MBMS-enabled low-grade UE, a UE in no support an MBMS counting response mechanism, e.g., a Release 9 (R9)-enabled UE, etc., they cannot read the MCCH change notification transmitted over the PDCCH scrambled by the MR-RNTI and in the SIB 13, so the low-grade UEs will not be changed anyway but maintain their current state. The low-grade UEs can read the MCCH change notification transmitted over the PDCCH scrambled by the M-RNTI but only the bits used by the PDCCH to indicate the MCCHs, which are 8 bits in this embodiment. When all the values of the bits indicating the MCCHs are 0, it means in this embodiment that there is an MCCH change indicator indicating occurrence of a changed MCCH, but the low-grade UEs cannot know this meaning or they determine that no MCCH is changed and maintain their current state when all the values of the bits of the MCCHs are 0. When not all the values of the bits indicating the MCCHs are 0, it means in this embodiment that there is an changed MCCH and it is indicated definitively which MCCH is changed, and the low-grade UEs can obtain identification information of the changed MCCH but cannot receive the MBMS counting request over the changed MCCH and instead maintain their current state. Thus the solution of this embodiment has no influence on the low-grade UEs.

The communication system in this embodiment can further include the MCE configured to transmit the MBMS counting indication message and to receive the summary result.

Figure 2:
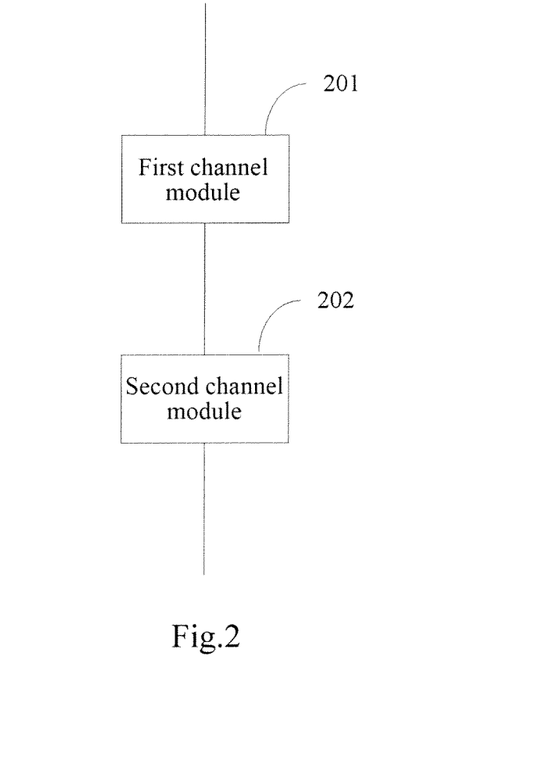
FIG. 2 is a general structural diagram of a node B in an embodiment of the invention.

Referring to FIG. 2, the node B in this embodiment includes a first channel module 201 and a second channel module 202.

The first channel module 201 is configured, when an MBMS counting procedure is triggered, to transmit a Multicast Control Channel (MCCH) change notification to the user equipment over a Physical Downlink Control Channel (PDCCH) scrambled by a Radio Network Temporary Identifier (RNTI) or in a system message in a modification period. The first channel module 201 transmits the MCCH change notification to the user equipment over the PDCCH scrambled by the RNTI or in the system message in a modification period upon reception of an MBMS counting indication message transmitted from the MCE or transmits the MCCH change notification to the user equipment over the PDCCH scrambled by the RNTI or in the system message periodically in the range of a configured interval of time.

The second channel module 202 is configured to transmit an MBMS counting request to the user equipment over a changed MCCH in a next modification period.

Figure 3:
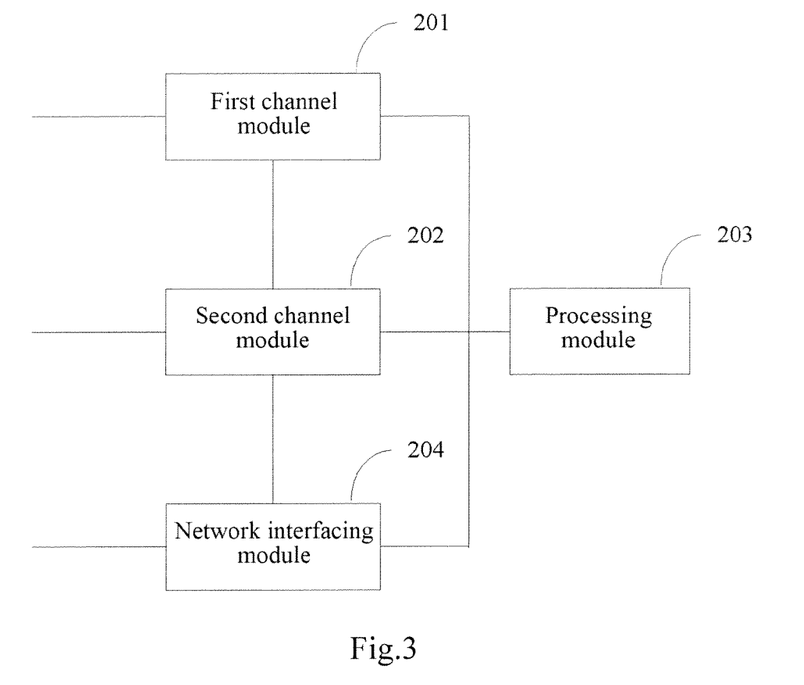
FIG. 3 is the detailed structural diagram of a node B in an embodiment of the invention.

The second channel module 202 is further configured to receive an MBMS counting response transmitted from the UE. The node B further includes a processing module 203, e.g., a CPU, etc., and a network interfacing module 204 as illustrated in FIG. 3. The processing module 203 is configured to summarize the MBMS counting responses. The network interfacing module 204 is configured to transmit a summary result to the MCE. The network interfacing module 204 is further configured to receive the MBMS counting indication message. The network interfacing module 204 transmits the summary result to the MCE at a configured second interval of time or transmits the summary result to the MCE when the summary result satisfies a preset report condition.

Figure 4:
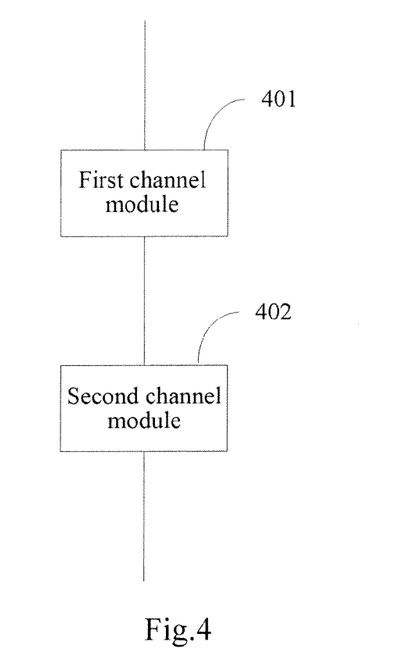
FIG. 4 is a general structural diagram of a UE in an embodiment of the invention.

Referring to FIG. 4, the UE in this embodiment includes a first channel module 401 and a second channel module 402.

The first channel module 401 is configured to receive a Multicast Control Channel (MCCH) change notification over the Physical Downlink Control Channel (PDCCH) scrambled by a Radio Network Temporary Identifier (RNTI) or in a system message in a modification period.

The second channel module 402 is configured to receive an MBMS counting request over a changed MCCH in a next modification period and to return an MBMS counting response.

Figure 5:
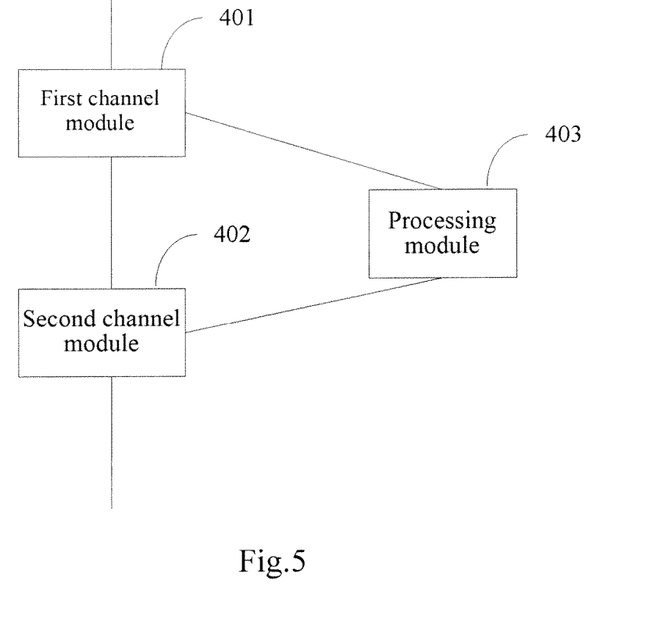
FIG. 5 is a detailed structural diagram of the UE in an embodiment of the invention.

The UE further includes a processing module 403, e.g., a CPU, etc., as illustrated in FIG. 5. The processing module 403 is configured to parse the MCCH change notification and the MBMS counting request and to generate the MBMS counting response. When the MBMS counting request includes a responding condition, the processing module 403 is further configured to determine whether the responding condition is satisfied and to generate the MBMS counting response when the responding condition is satisfied. The second channel module 402 returns the MBMS counting response when it is determined that the UE satisfies the responding condition.

The internal structures and functions of the communication system, the node B and the UE have been described above, and a process of requesting and responding to an MBMS counting will be introduced below.

Figure 6:
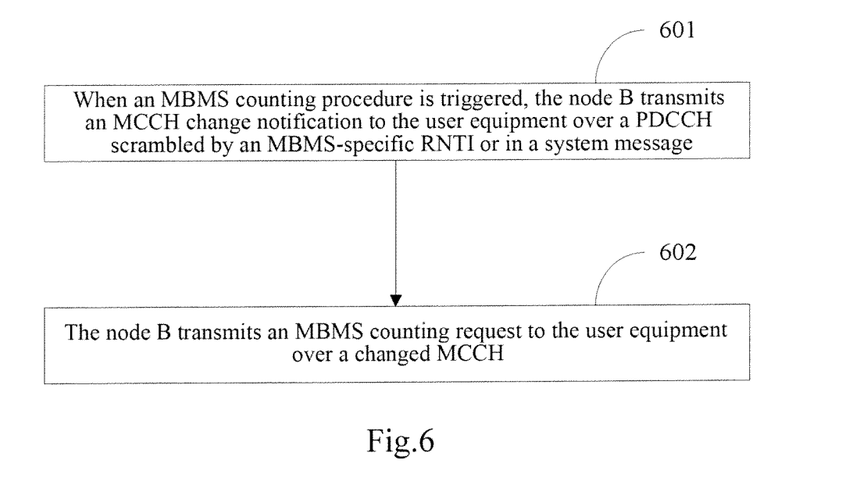
FIG. 6 is a flow chart of a method of requesting an MBMS counting in an embodiment of the invention.

Referring to FIG. 6, a flow of a method of requesting an MBMS counting in this embodiment is as follows:

Step 601: When an MBMS counting procedure is triggered, the node B transmits an MCCH change notification to the user equipment over a PDCCH scrambled by an MBMS-specific RNTI or in a system message.

Step 602: The node B transmits an MBMS counting request to the user equipment over a changed MCCH.

Figure 7:
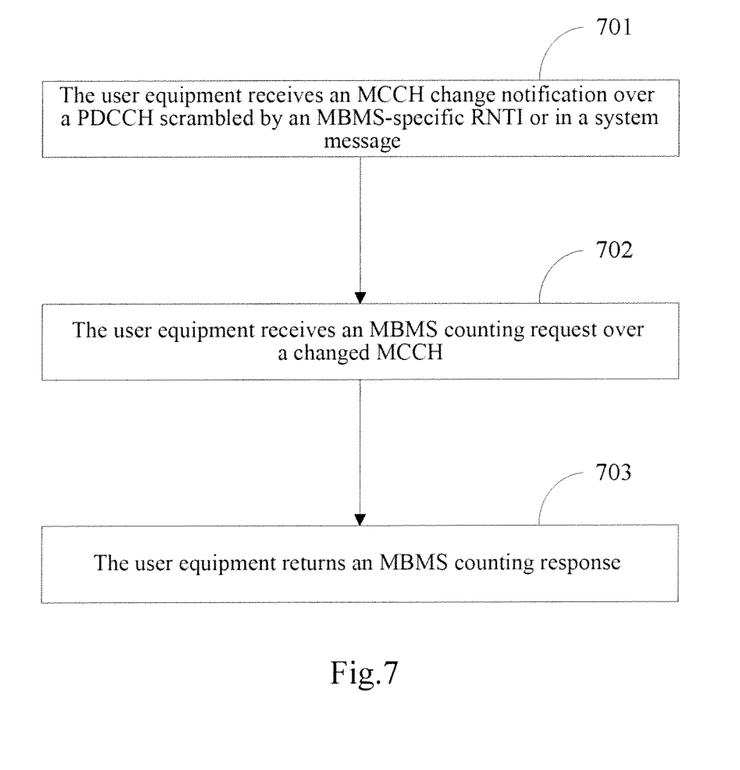
FIG. 7 is a flow chart of a method of responding to an MBMS counting in an embodiment of the invention.

Referring to FIG. 7, a flow of a method of responding to an MBMS counting in this embodiment is as follows:

Step 701: The user equipment receives an MCCH change notification over a PDCCH scrambled by an MBMS-specific RNTI or in a system message.

Step 702: The user equipment receives an MBMS counting request over a changed MCCH.

Step 703: The user equipment returns an MBMS counting response.

Since the RNTI may be an M-RNTI or an MR-RNTI or the MCCH change notification can be transmitted in the system message, the processes will be introduced in details below in five embodiments.

Figure 8:
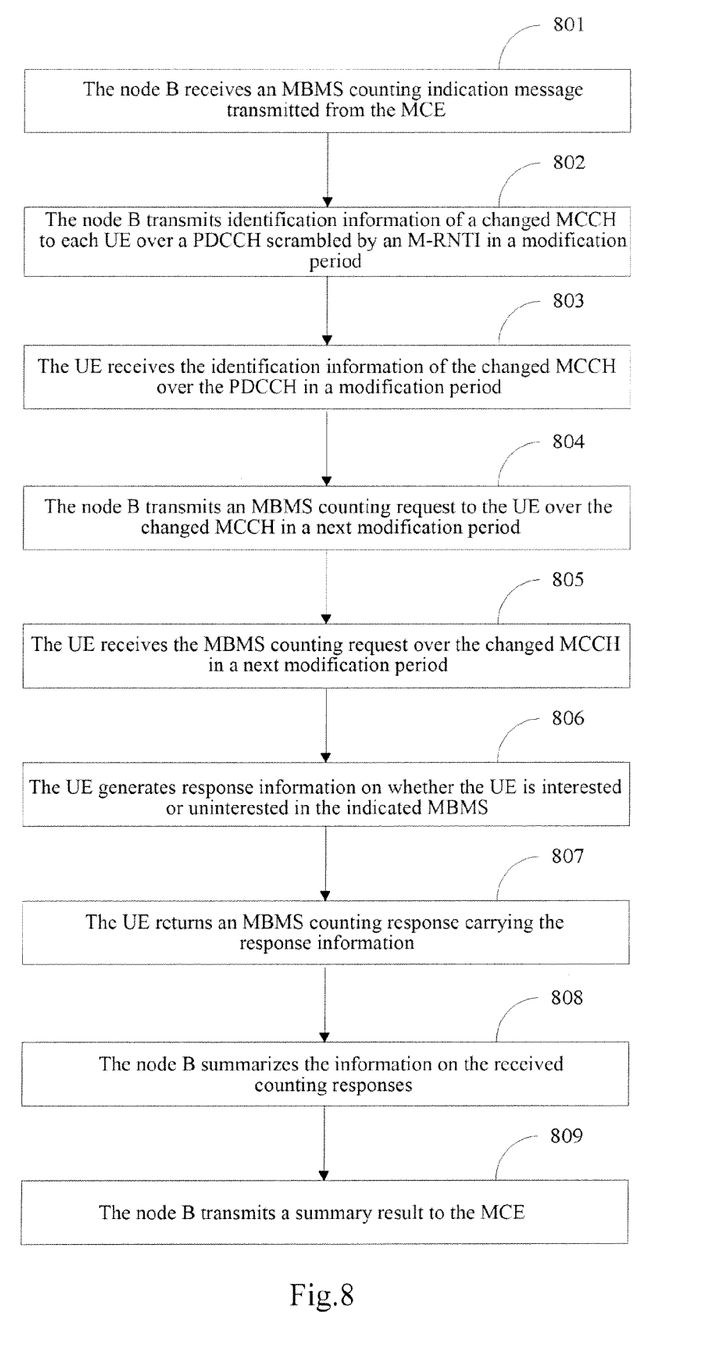
FIG. 8 is a flow chart of a method of requesting and responding to an MBMS counting in an embodiment of the invention.

Referring to FIG. 8, a flow of a method of requesting and responding to an MBMS counting in the first scheme described above in this embodiment is as follows:

Step 801: The node B receives an MBMS counting indication message transmitted from the MCE.

Step 802: The node B transmits identification information of a changed MCCH to each UE over a PDCCH scrambled by an M-RNTI in a modification period. For example, the PDCCH supports 8 bits, and each bit corresponds to one MCCH and takes the value of 1 indicating that the MCCH is changed.

Step 803: The UE receives the identification information of the changed MCCH over the PDCCH in a modification period.

Step 804: The node B transmits an MBMS counting request to the UE over the changed MCCH in a next modification period. The MBMS counting request includes an identifier of an MBMS.

Step 805: The UE receives the MBMS counting request over the changed MCCH in a next modification period. This step takes place in the same MCCH modification period as the step 804.

The step 802 to the step 805 can be performed in one MCCH modification period, and in order to improve the accuracy of information transmission in this embodiment, the steps 802 and 803 are performed in one MCCH modification period, and the steps 804 and 805 are performed in the MCCH modification period next to the steps 802 and 803.

Step 806: The UE generates response information on whether the UE is interested or uninterested in the indicated MBMS. For a low-grade UE, the step 806 and steps subsequent thereto may not be performed but it can simply return to their original state.

Step 807: The UE returns an MBMS counting response carrying the response information.

Step 808: The node B summarizes the information on the received counting responses, for example, make a statistic of the number of UEs interested in the indicated MBMS, the ratio of the number of UEs interested in the indicated MBMS to the total number of UEs, etc.

Step 809: The node B transmits a summary result to the MCE.

Figure 9:
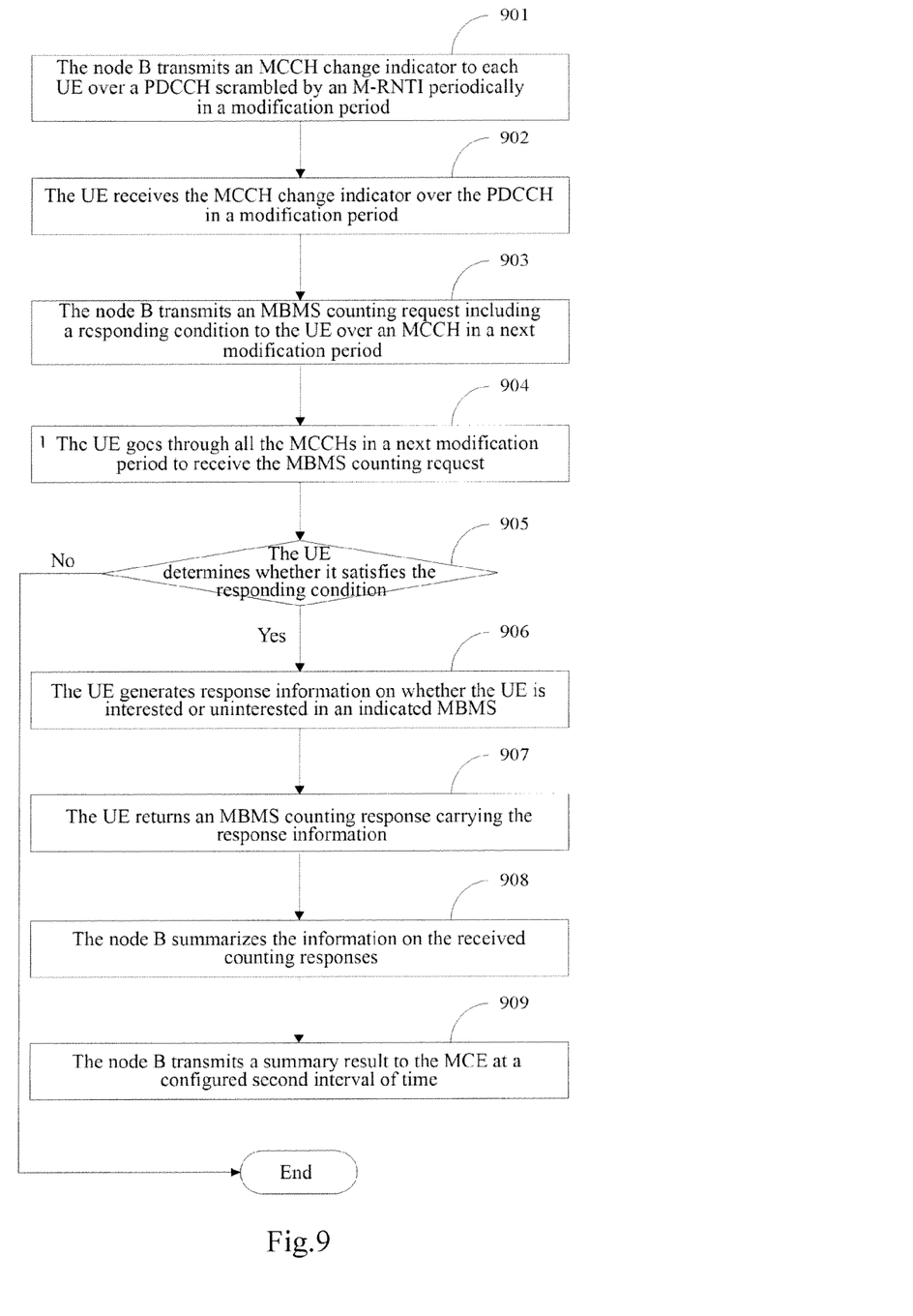
FIG. 9 is a flow chart of another method of requesting and responding to an MBMS counting in an embodiment of the invention.

Referring to FIG. 9, a flow of a method of requesting and responding to an MBMS counting in the second scheme described above in this embodiment is as follows:

Step 901: The node B transmits an MCCH change indicator to each UE over a PDCCH scrambled by an M-RNTI periodically in a modification period. For example, the PDCCH supports 8 bits, and all the values of the 8 bits are 0.

Step 902: The UE receives the MCCH change indicator over the PDCCH in a modification period. For a low-grade UE, the step 903 and steps subsequent thereto may not be preformed but it can simply return to their original state.

Step 903: The node B transmits an MBMS counting request including a responding condition to the UE over an MCCH in a next modification period.

Step 904: The UE goes through all the MCCHs in a next modification period to receive the MBMS counting request. This step takes place in the same MCCH modification period as the step 903.

Step 905: The UE determines whether it satisfies the responding condition, and if so, then the process proceeds to the step 906; otherwise, the flow ends.

Step 906: The UE generates response information on whether the UE is interested or uninterested in an indicated MBMS.

Step 907: The UE returns an MBMS counting response carrying the response information.

Step 908: The node B summarizes the information on the received counting responses.

Step 909: The node B transmits a summary result to the MCE at a configured second interval of time.

Figure 10:
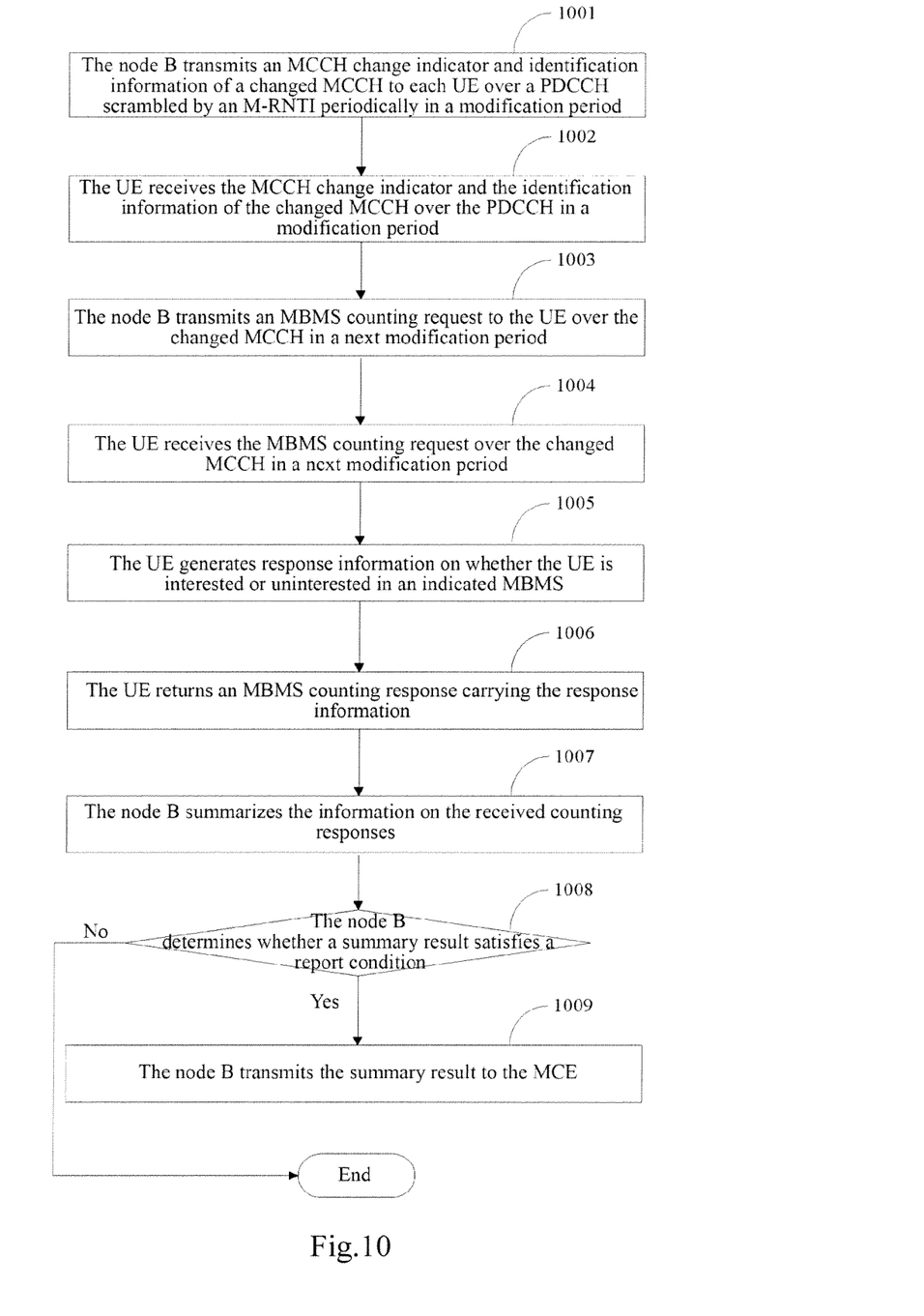
FIG. 10 is a flow chart of a method of requesting and responding to an MBMS counting when an MCCH change indicator and identification information of a changed MCCH is transmitted in an embodiment of the invention.

Referring to FIG. 10, a flow of a method of requesting and responding to an MBMS counting when an MCCH change indicator and identification information of a changed MCCH is transmitted in this embodiment is as follows:

Step 1001: The node B transmits an MCCH change indicator and identification information of a changed MCCH to each UE over a PDCCH scrambled by an M-RNTI periodically in a modification period. For example, the PDCCH supports 10 bits including 8 bits with one-to-one correspondence to MCCHs and 1 bit for the MCCH change indicator, where each of the 8 bits takes the value of 1 to indicate that the MCCH is changed, and the 1 bit takes the value of 1.

Step 1002: The UE receives the MCCH change indicator and the identification information of the changed MCCH over the PDCCH in a modification period. For a low-grade UE, the step 1003 and steps subsequent thereto may not be performed but it can simply return to their original state.

Step 1003: The node B transmits an MBMS counting request to the UE over the changed MCCH in a next modification period.

Step 1004: The UE receives the MBMS counting request over the changed MCCH in a next modification period. This step takes place in the same MCCH modification period as the step 1003.

Step 1005: The UE generates response information on whether the UE is interested or uninterested in an indicated MBMS.

Step 1006: The UE returns an MBMS counting response carrying the response information.

Step 1007: The node B summarizes the information on the received counting responses.

Step 1008: The node B determines whether a summary result satisfies a report condition, and if so, then the process proceeds to the step 1009; otherwise, the flow ends. For example, the number of interested UEs above a preset number threshold indicates that the report condition is satisfied, the number of interested UEs below a preset number threshold indicates that the report condition is satisfied, etc.

Step 1009: The node B transmits the summary result to the MCE.

Figure 11:
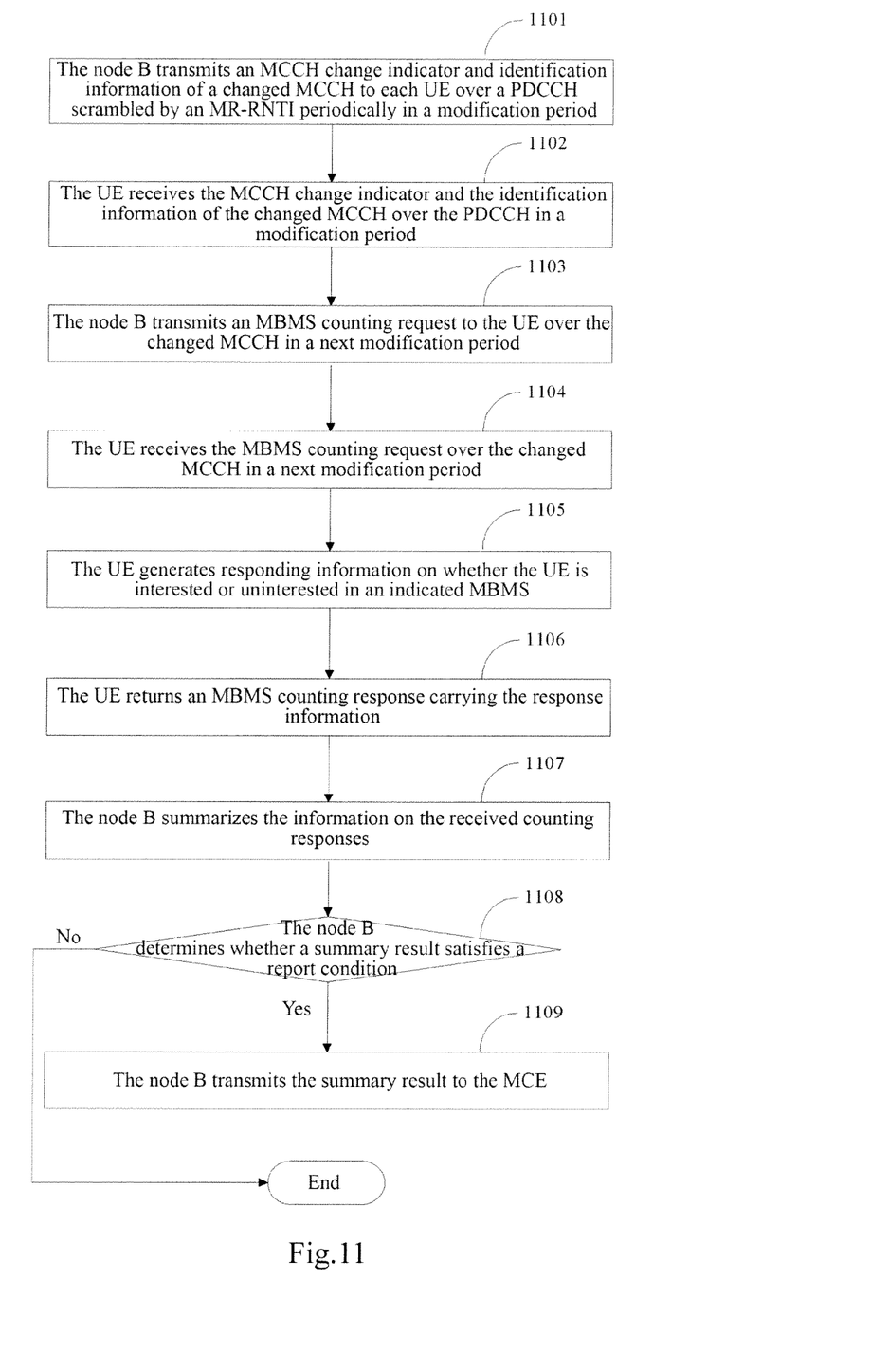
FIG. 11 is a flow chart of a method of requesting and responding to an MBMS counting when an RNTI is a Multimedia Broadcast Multicast Service (MBMS) State Report-specific Radio Network Temporary Identifier (MR-RNTI) in an embodiment of the invention.

Referring to FIG. 11, a flow of a method of requesting and responding to an MBMS counting when an RNTI is an MR-RNTI in this embodiment is as follows:

Step 1101: The node B transmits an MCCH change indicator and identification information of a changed MCCH to each UE over a PDCCH scrambled by an MR-RNTI periodically in a modification period. A transmission cycle of the MCCH change indicator and the identification information of the changed MCCH can be configured by the MCE to the node B in an MBMS counting indication message.

Step 1102: The UE receives the MCCH change indicator and the identification information of the changed MCCH over the PDCCH in a modification period. For a low-grade UE, the step 1103 and steps subsequent thereto may not be performed but it can simply return to their original state.

Step 1103: The node B transmits an MBMS counting request to the UE over the changed MCCH in a next modification period.

Step 1104: The UE receives the MBMS counting request over the changed MCCH in a next modification period. This step takes place in the same MCCH modification period as the step 1103.

Step 1105: The UE generates response information on whether the UE is interested or uninterested in an indicated MBMS.

Step 1106: The UE returns an MBMS counting response carrying the response information.

Step 1107: The node B summarizes the information on the received counting responses.

Step 1108: The node B determines whether a summary result satisfies a report condition, and if so, then the process proceeds to the step 1109; otherwise, the flow ends.

Step 1109: The node B transmits the summary result to the MCE.

Figure 12:
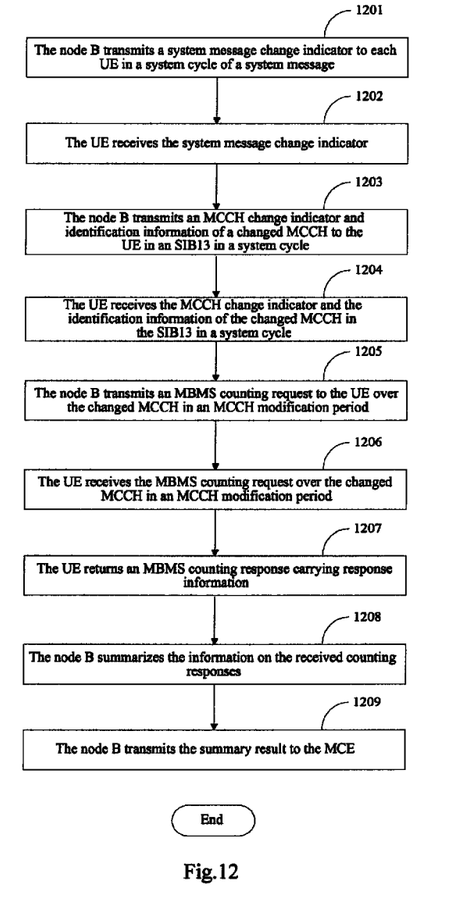
FIG. 12 is a flow chart of a method of indicating an occurring MCCH change in a system message and responding to an MBMS counting in an embodiment of the invention.

Referring to FIG. 12, a method of indicating an occurring MCCH change in a system message and responding to an MBMS counting in this embodiment is as follows:

Step 1201: The node B transmits a system message change indicator to each UE.

Step 1202: The UE receives the system message change indicator.

Step 1203: The node B transmits an MCCH change indicator and identification information of a changed MCCH to the UE in an SIB13.

Step 1204: The UE receives the MCCH change indicator and the identification information of the changed MCCH in the SIB13.

Step 1205: The node B transmits an MBMS counting request to the UE over the changed MCCH in an MCCH modification period.

Step 1206: The UE receives the MBMS counting request over the changed MCCH in an MCCH modification period. This step is performed in the same MCCH modification period as the step 1205. In this embodiment, a system cycle shall be followed by the MCCH modification period, and the two cycles are allowed to overlap.

Step 1207: The UE returns an MBMS counting response carrying response information.

Step 1208: The node B summarizes the information on the received counting responses.

Step 1209: The node B transmits the summary result to the MCE.

In the embodiments of the invention, a node B transmits an MCCH change notification to each user equipment over a Physical Downlink Control Channel (PDCCH) scrambled by a Radio Network Temporary Identifier (RNTI) or in a system message, and since the PDCCH and the system message are a channel and a message which all the UEs can monitor in a cell, the MCCH change notification can reach all the UEs, thus facilitating reception of MBMS counting responses of all the UEs, particularly a UE which is not receiving an MBMS, making the information on the received counting responses more comprehensive and further facilitating accurate determination as to whether to initiate the MBMS. In the embodiments of the invention, the MCCH change notification can be transmitted in an existing message structure, or a message structure can be designed separately for the MCCH change notification, and both layer 1 signaling and a system message can be applicable to the embodiments of the invention; and the MCCH change notification may include an MCCH change indicator or identification information of a changed MCCH or include an MCCH change indicator and identification information of a changed MCCH and can accommodate demands of different systems, different bandwidths and different application scenarios. Furthermore in the embodiments of the invention there are a variety of responding conditions and report conditions with different advantages which can apply as needed in practice.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of requesting Multimedia Broadcast Multicast Service, MBMS, counting, comprising the steps of:
    a node B, when an MBMS counting procedure is triggered, transmitting a Multicast Control Channel, MCCH, change notification to a user equipment over a Physical Downlink Control Channel, PDCCH, scrambled by an MBMS-specific Radio Network Temporary Identifier, RNTI; and
    the node B transmitting an MBMS counting request to the user equipment over a changed MCCH;
    wherein the MCCH change notification includes identification information of the changed MCCH or an MCCH change indicator, or includes identification information of the changed MCCH and an MCCH change indicator; and
    wherein the Radio Network Temporary Identifier, RNTI, is a Multimedia Broadcast Multicast Service, MBMS, Radio Network Temporary Identifier, RNTI, M-RNTI;
    when a total number of bits corresponding to the PDCCH scrambled by the M-RNTI does not exceed a total number of MCCHs indicated by the PDCCH, the MCCH change notification includes the identification information of the changed MCCH or the MCCH change indicator; and
    when the total number of bits corresponding to the PDCCH scrambled by the M-RNTI exceeds the total number of MCCHs indicated by the PDCCH, the MCCH change notification includes the identification information of the changed MCCH and the MCCH change indicator or includes the MCCH change indicator.

2. The method according to claim 1, wherein the step of the node B transmitting the MCCH change notification to the user equipment over the PDCCH scrambled by the RNTI comprises:
    the node B transmitting the MCCH change notification to the user equipment over the PDCCH scrambled by the RNTI in a modification period upon reception of an MBMS counting indication message transmitted from an MBMS Coordination Entity, MCE; or
    the node B transmitting the MCCH change notification to the user equipment over the PDCCH scrambled by the RNTI periodically in a range of a configured interval of time.

3. The method according to claim 1, wherein when the total number of bits corresponding to the PDCCH scrambled by the M-RNTI does not exceed the total number of MCCHs and the MCCH change notification includes the identification information of the changed MCCH, each bit corresponds to one MCCH, and the identification information of the changed MCCH is represented by a value of the bit;
    when the total number of bits corresponding to the PDCCH scrambled by the M-RNTI does not exceed the total number of MCCHs and the MCCH change notification includes the MCCH change indicator, all the bits corresponding to the PDCCH scrambled by the M-RNTI are 0 indicating the MCCH change indicator;
    when the total number of bits corresponding to the PDCCH scrambled by the M-RNTI exceeds the total number of MCCHs indicated by the PDCCH and the MCCH change notification includes the identification information of the changed MCCH and the MCCH change indicator, excess bits beyond the total number of MCCHs indicated by the PDCCH are for the MCCH change indicator, each MCCH corresponds to one bit, and the identification information of the changed MCCH is represented by the value of the bit corresponding to the MCCH; and when the total number of bits corresponding to the PDCCH scrambled by the M-RNTI exceeds the total number of MCCHs indicated by the PDCCH and the MCCH change notification includes the MCCH change indicator, excess bits beyond the total number of MCCHs indicated by the PDCCH are for the MCCH change indicator, each MCCH corresponds to one bit, and all the values of the bits corresponding to the MCCHs are 0.

4. The method according to claim 1, further comprising the steps of: the node B receiving MBMS counting responses transmitted from user equipments, summarizing the MBMS counting responses and transmitting a summary result to an MBMS Coordination Entity, MCE.

5. A method of responding to a Multimedia Broadcast Multicast Service, MBMS, counting, comprising the steps of:
   a user equipment receiving a Multicast Control Channel, MCCH, change notification over a Physical Downlink Control Channel, PDCCH, scrambled by an MBMS-specific Radio Network Temporary Identifier, RNTI;
   the user equipment receiving an MBMS counting request over a changed MCCH; and
   the user equipment returning an MBMS counting response;
   wherein the MCCH change notification includes identification information of the changed MCCH or an MCCH change indicator, or includes identification information of the changed MCCH and an MCCH change indicator; and
   wherein the Radio Network Temporary Identifier, RNTI, is a Multimedia Broadcast Multicast Service, MBMS, Radio Network Temporary Identifier, RNTI, M-RNTI;
   when a total number of bits corresponding to the PDCCH scrambled by the M-RNTI does not exceed a total number of MCCHs indicated by the PDCCH, the MCCH change notification includes the identification information of the changed MCCH or the MCCH change indicator; and
   when the total number of bits corresponding to the PDCCH scrambled by the M-RNTI exceeds the total number of MCCHs indicated by the PDCCH, the MCCH change notification includes the identification information of the changed MCCH and the MCCH change indicator or includes the MCCH change indicator.

6. The method according to claim 5, wherein
   when the total number of bits corresponding to the PDCCH scrambled by the M-RNTI does not exceed the total number of MCCHs, and the MCCH change notification includes identification information of the changed MCCH, each bit corresponds to one MCCH, and the identification information of the changed MCCH is represented by a value of the bit;
   when the total number of bits corresponding to the PDCCH scrambled by the M-RNTI does not exceed the total number of MCCHs, and the MCCH change notification includes the MCCH change indicator, all the bits corresponding to the PDCCH scrambled by the M-RNTI are 0 indicating the MCCH change indicator;
   when the total number of bits corresponding to the PDCCH scrambled by the M-RNTI exceeds the total number of MCCHs indicated by the PDCCH, and the MCCH change notification includes the identification information of the changed MCCH and the MCCH change indicator, each MCCH corresponds to one bit, the identification information of the changed MCCH is represented by the value of the bit, and excess bits beyond the total number of MCCHs indicated by the PDCCH are for the MCCH change indicator; and
   when the total number of bits corresponding to the PDCCH scrambled by the M-RNTI exceeds the total number of MCCHs indicated by the PDCCH, and the MCCH change notification includes the MCCH change indicator, excess bits beyond the total number of MCCHs indicated by the PDCCH are for the MCCH change indicator, each MCCH corresponds to one bit, and all the values of the bits corresponding to the MCCHs are 0.

7. A node B, comprising:
   a first channel module configured, when an MBMS counting procedure is triggered, to transmit a Multicast Control Channel, MCCH, change notification to a user equipment over a Physical Downlink Control Channel, PDCCH, scrambled by an MBMS-specific Radio Network Temporary Identifier, RNTI; and
   a second channel module configured to transmit an MBMS counting request to the user equipment over a changed MCCH;
   wherein the MCCH change notification includes identification information of the changed MCCH or an MCCH change indicator or includes identification information of the changed MCCH and an MCCH change indicator;
   wherein the Radio Network Temporary Identifier, RNTI, is a Multimedia Broadcast Multicast Service, MBMS, Radio Network Temporary Identifier, RNTI, M-RNTI;
   when a total number of bits corresponding to the PDCCH scrambled by the M-RNTI does not exceed a total number of MCCHs indicated by the PDCCH, the MCCH change notification includes the identification information of the changed MCCH or the MCCH change indicator; and
   when the total number of bits corresponding to the PDCCH scrambled by the M-RNTI exceeds the total number of MCCHs indicated by the PDCCH, the MCCH change notification includes the identification information of the changed MCCH and the MCCH change indicator or includes the MCCH change indicator.

8. The node B according to claim 7, wherein the first channel module transmits the MCCH change notification to the user equipment over the PDCCH scrambled by the RNTI in a modification period upon reception of an MBMS counting indication message transmitted from an MCE or transmits the MCCH change notification to the user equipment over the PDCCH scrambled by the RNTI periodically in a range of a configured interval of time.

9. The node B according to claim 7, wherein when the total number of bits corresponding to the PDCCH scrambled by the M-RNTI does not exceed the total number of MCCHs and the MCCH change notification includes the identification information of the changed MCCH, each bit corresponds to one MCCH, and the identification information of the changed MCCH is represented by a value of the bit;
   when the total number of bits corresponding to the PDCCH scrambled by the M-RNTI does not exceed the total number of MCCHs and the MCCH change notification includes the MCCH change indicator, all the bits corresponding to the PDCCH scrambled by the M-RNTI are 0 indicating the MCCH change indicator;
   when the total number of bits corresponding to the PDCCH scrambled by the M-RNTI exceeds the total number of MCCHs indicated by the PDCCH and the MCCH change notification includes the identification information of the changed MCCH and the MCCH change indicator, each MCCH corresponds to one bit, the identification information of the changed MCCH is represented by the value of the bit, and excess bits beyond the total number of MCCHs indicated by the PDCCH are for the MCCH change indicator; and when the total number of bits corresponding to the PDCCH scrambled by the M-RNTI exceeds the total number of MCCHs indicated by the PDCCH and the MCCH change notification includes the MCCH change indicator, excess bits beyond the total number of MCCHs indicated by the PDCCH are for the MCCH change indicator, each MCCH corresponds to one bit, and all the values of the bits corresponding to the MCCHs are 0.

10. The node B according to claim 7, wherein the second channel module is further configured to receive an MBMS counting response transmitted from the user equipment; and the node B further comprises:

a processing module configured to summarize the MBMS counting responses; and a network interfacing module configured to transmitting a summary result to an MCE.

11. A user equipment, comprising:

a first channel module configured to receive a Multicast Control Channel, MCCH, change notification over a Physical Downlink Control Channel, PDCCH, scrambled by an MBMS-specific Radio Network Temporary Identifier, RNTI; and a second channel module configured to receive an MBMS counting request over a changed MCCH and to return an MBMS counting response;

wherein the MCCH change notification includes identification information of the changed MCCH or an MCCH change indicator, or includes identification information of the changed MCCH and an MCCH change indicator; and wherein the Radio Network Temporary Identifier, RNTI, is a Multimedia Broadcast Multicast Service, MBMS, Radio Network Temporary Identifier, RNTI, M-RNTI;

when a total number of bits corresponding to the PDCCH scrambled by the M-RNTI does not exceed a total number of MCCHs indicated by the PDCCH, the MCCH change notification includes the identification information of the changed MCCH or the MCCH change indicator; and when the total number of bits corresponding to the PDCCH scrambled by the M-RNTI exceeds the total number of MCCHs indicated by the PDCCH, the MCCH change notification includes the identification information of the changed MCCH and the MCCH change indicator or includes the MCCH change indicator.

12. The user equipment according to claim 11, wherein when the total number of bits corresponding to the PDCCH scrambled by the M-RNTI does not exceed the total number of MCCHs, and the MCCH change notification includes identification information of the changed MCCH, each bit corresponds to one MCCH, and the identification information of the changed MCCH is represented by a value of the bit;

when the total number of bits corresponding to the PDCCH scrambled by the M-RNTI does not exceed the total number of MCCHs, and the MCCH change notification includes the MCCH change indicator, all the bits corresponding to the PDCCH scrambled by the M-RNTI are 0 indicating the MCCH change indicator;

when the total number of bits corresponding to the PDCCH scrambled by the M-RNTI exceeds the total number of MCCHs indicated by the PDCCH, and the MCCH change notification includes the identification information of the changed MCCH and the MCCH change indicator, each MCCH corresponds to one bit, the identification information of the changed MCCH is represented by the value of the bit, and excess bits beyond the total number of MCCHs indicated by the PDCCH are for the MCCH change indicator; and when the total number of bits corresponding to the PDCCH scrambled by the M-RNTI exceeds the total number of MCCHs indicated by the PDCCH, and the MCCH change notification includes the MCCH change indicator, excess bits beyond the total number of MCCHs indicated by the PDCCH are for the MCCH change indicator, each MCCH corresponds to one bit, and all the values of the bits corresponding to the MCCHs are 0.

13. The method according to claim 1, wherein the MBMS counting request includes a responding condition to instruct a user equipment satisfying the responding condition to make a response.

14. The method according to claim 13, wherein the responding condition includes at least one of:

that a user equipment in a connected state makes a report;

that all the user equipments make a report;

that a user equipment interested in a service specified by the MBMS counting request makes a report; and that a user equipment satisfying a configured probability makes a report.

15. The method according to claim 4, wherein the step of the node B transmitting the summary result to the MCE comprises:

the node B transmitting the summary result to the MCE at a configured second interval of time; or the node B transmitting the summary result to the MCE when the summary result satisfies a preset report condition.

16. The method according to claim 5, wherein the MBMS counting request includes a responding condition; and the step of the user equipment returning the MBMS counting response comprises: the user equipment returning the MBMS counting response upon determining that the user equipment satisfies the responding condition.

17. The node B according to claim 7, wherein the MBMS counting request includes a responding condition to instruct a user equipment satisfying the responding condition to make a response.

18. The node B according to claim 17, wherein the responding condition includes at least one of:

that a user equipment in a connected state makes a report;

that all the user equipments make a report;

that a user equipment interested in a service specified by the MBMS counting request makes a report; and that a user equipment satisfying a configured probability makes a report.

19. The node B according to claim 10, wherein the network interfacing module transmits the summary result to the MCE at a configured second interval of time or transmits the summary result to the MCE when the summary result satisfies a preset report condition.

20. The user equipment according to claim 11, wherein the MBMS counting request includes a responding condition; and the second channel module returns the MBMS counting response upon determining that the user equipment satisfies the responding condition.

* * * * *